Jan. 23, 1968 L. F. WILDGEN 3,365,227
PORTABLE ARTICLE OF MANUFACTURE
Original Filed March 15, 1965
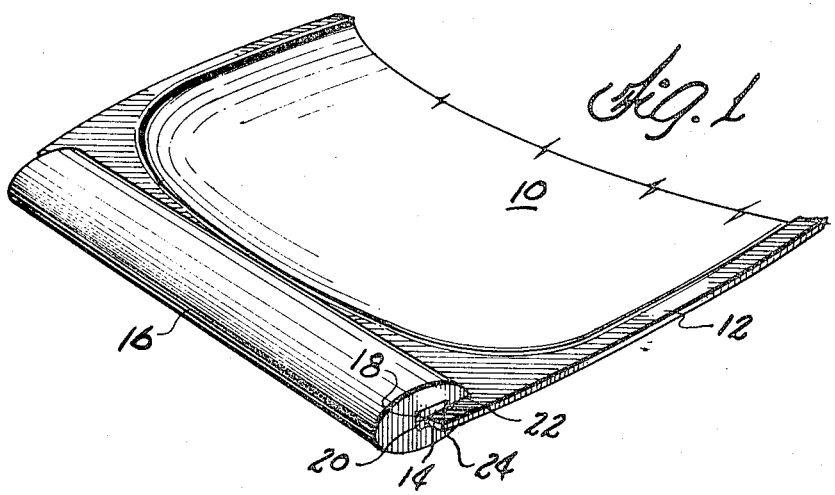
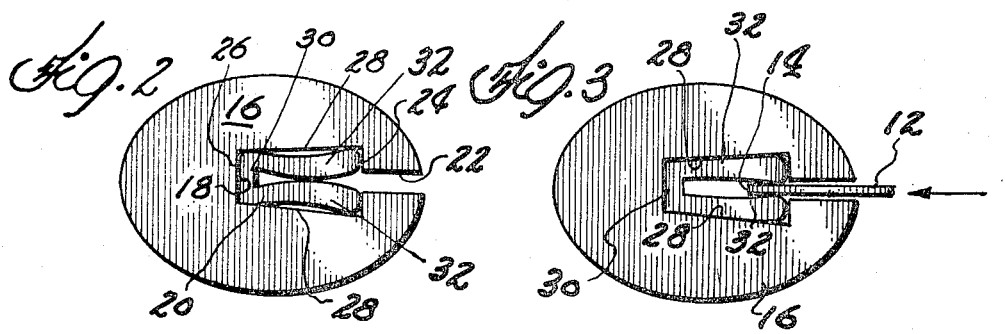
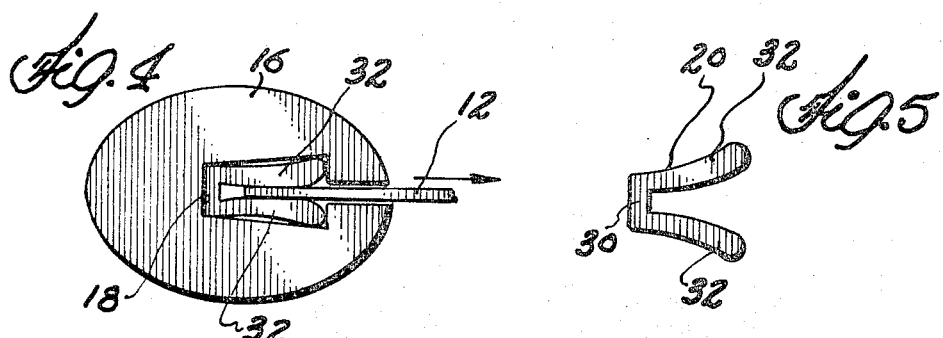
Inventor
Leo F. Wildgen
By
Pendleton, Neuman,
Seibold & Williams
Attorneys

United States Patent Office 3,365,227
Patented Jan. 23, 1968

3,365,227
PORTABLE ARTICLE OF MANUFACTURE
Leo F. Wildgen, Minneapolis, Minn., assignor, by mesne assignments, to Salm-Harley Corporation, Chicago, Ill., a corporation of Illinois
Continuation of application Ser. No. 439,730, Mar. 15, 1965. This application Jan. 3, 1967, Ser. No. 607,074
10 Claims. (Cl. 294—27)

This is a continuation of Ser. No. 439,730, filed Mar. 15, 1965 and now abandoned.

This invention relates to improvements in a portable article of manufacture and, more particularly, to an improved removable handle for such portable articles.

It is desirable in many instances to provide handles for flatware and the like wherein the handles are positively secured to the article during use but removable for cleaning or when the utensil is placed in an oven, or under other adverse ambient conditions.

Various removable handles for culinary articles, serving trays, platters and the like, have heretofore been proposed. However, each prior device has limitations and disadvantages which have prevented widespread adoption. In many of the prior systems a mechanical latch or lock is employed to grip the handle to the article. The mechanism generally must be actuated to selectively engage the article and the actuating mechanism is subject to malfunction. Moreover, such mechanisms are generally cumbersome and unattractive and are also subject to contamination in use. Still other prior devices comprise an integrally molded plastic article in which an effort is made to obtain resilience in certain areas with rigidity in others. However, such devices generally fail to grip the articles tenaciously, suffer fatigue and distortion in use, and generally lack the desired esthetic qualities.

It is therefore a principal object of this invention to provide an improved removable handle for portable articles.

It is another object of this invention to provide a portable article which includes one or more removable handles for increased versatility.

It is still another object of this invention to provide a simple unitary removable handle for culinary articles or the like in which the handle tenaciously engages the article when properly positioned without the use of auxiliary mechanical clamps or other mechanisms requiring actuation.

It is still a further object of this invention to provide an improved removable handle which is inexpensive and easy to manufacture, which can be cleaned and repaired, and which is of simple design and esthetic quality.

Further and additional objects of this invention will become manifest from a consideration of this description, the accompanying drawing, and the appended claims.

In one form of this invention a platter is provided which is formed of stainless steel and adapted for use in an oven or broiler in the actual preparation of food. Associated removable esthetic handles, preferably made of walnut, teakwood, or a similar decorative material, include unique resilient internal clamps by which they are retained on the edges of the platter for use in serving. The unique clamping mechanism in the preferred embodiment includes a channel-like rubber member disposed within an elongate cavity in the relatively rigid handle with the bight portion secured to the inner walls of the handle.

For a more complete understanding of this invention reference will now be made to the accompanying drawing wherein:

FIGURE 1 is a perspective view of one embodiment of this invention showing a fragmentary portion of a portable article;

FIG. 2 is an enlarged end view of the removable handle forming a part of the embodiment of FIG. 1 with the portable article removed therefrom and the resilient member in relaxed position;

FIG. 3 is an end view of the removable handle corresponding to FIG. 2 illustrating the insertion of the portable article therein;

FIG. 4 is an end view of the removable handle of FIG. 2 illustrating the manner in which a portable article is removed therefrom; and FIG. 5 is an end view of the resilient member of FIG. 2 as it appears prior to insertion within the removable handle.

Referring now to the drawing, and more particularly to FIG. 1, a steak platter 10 is illustrated having a peripheral flange 12. It will be obvious that any utensil or article which can advantageously employ removable handles and has an appropriate free edge may be adapted for use in this invention. In the described embodiment the flange 12 has curved side edges and a substantially straight end edge 14 which is received within the handle 16. The handle may be adapted to accommodate other than straight edges, if desired.

The handle 16 has a central elongate cavity 18 formed therein into which is inserted a resilient gripping member 20. A slot 22 is formed in the handle 16 and communicates between the outer ornamental surface of the handle and the forward wall 24 of the cavity 18. By the proper selection of the various materials employed in practicing the invention it is possible to provide removable handles which may be placed on the end flanges of the article 10 with minimum force. However, due to the resilient action of the various components removal of the handle requires substantially greater force and it is retained on the flange with substantial tenacity.

The actual construction of the removable handle is more apparent from the end view of FIG. 2. The handle 16 is preferably formed of an ornamental wood such as walnut or teakwood. However, the handle can be formed of any desirable relatively rigid material including metals such as aluminum, magnesium or zinc, or moldable plastic materials of substantial rigidity. While the outer ornamental surface is shown as an ellipse it will be apparent that it may be round, rectilinear, or completely irregular or sculptured.

The central cavity 18 is formed throughout the length of the handle 16, and in the described embodiment the cavity is substantially rectangular with a rearward wall 26, a pair of generally parallel sidewalls 28 which diverge outwardly somewhat at a front wall 24. An elongate slot 22 is formed between the forward wall 24 and the ornamental surface of the handle. The resilient member 20 has a bight portion 30 disposed against the rearward wall 26 and a pair of spaced legs 32. The manner in which the resilient member 20 is secured within the handle will depend in part upon the relative dimensions of the various members. In one construction the resilience of the material from which the insert 20 is made was found sufficient to hold the insert within the handle. In another instance it was found desirable to cement the bight portion 30 to the rearward wall 26 of the cavity 18.

In one embodiment which has worked satisfactorily the resilient member 20 is a rubber extrusion which has the property of feeling slightly tacky to the touch and has a durometer hardness of approximately 40 to 45. By appropriate selection of dimensions, harder or softer rubber can be employed.

In one particular construction the portable article was a stainless steel platter having a thickness of .030 inch and the slot 22 in the handle has a width only slightly greater than the flange thickness. The dimensions should be selected so that the portable article will slide freely in the wood slot but will be gripped by the resilient insert. The precise dimension of the slot is not critical. The length and thickness of the slot should be coordinated, however, to prevent noticeable rocking of the handle on the flange. The resilient member 20 is so shaped and stressed that the two legs 32 have limited contact with the sidewalls 28 preferably near the forward wall 24. The legs are also shaped as shown in FIG. 2 to engage the portable article when it is inserted in such a manner that the resilient legs are urged outwardly against the sidewalls 28 to close the gap therebetween. The forward ends of legs 32 are rounded to facilitate the action which may be characterized as a "rolling action" of the rubber insert outward against sidewalls 28. This action is best illustrated in FIG. 3 where the forward edge 14 of the flange 12 has been inserted between the legs 32 and is moving inwardly. The surfaces of legs 32 engage the flange 12 and produce the rolling action urging the legs 32 outwardly against the sidewalls 28 and facilitating insertion of the flange 12 to the point where the forward edge 14 abuts the bight portion 30.

The phenomenon which appears to occur when the article 12 is removed from its position within the handle 16 is illustrated in FIG. 4. Therein it can be seen that as the flange 12 is withdrawn the shaped legs 32 are drawn, or rolled, outwardly against the surfaces of flange 12 and thus tend to lock against the flange and prevent removal. This phenomenon produces selective resistance to relative motion between the handle and the portable article which is especially desirable in the finished product.

FIG. 5 illustrates the resilient member 20 prior to insertion into the cavity 18. The legs 32 diverge somewhat from the bight 30 so that they are resiliently retained in the cavity 18. Thus cementing or other means of securement is augmented or may be avoided.

Variations of the basic configurations will immediately appear to one skilled in the art. The external configuration or ornamentation of the handle 16 may be selected for coordination with the portable articles with which the handle is employed. It is advantageous in manufacture, maintenance and repair that the cavity 18 extend throughout the handle. However, it will be manifest that this is not essential and the ends of the handle may be appropriately plugged, if desired. Also, the degree of tenacity with which the handle grips the article will depend in part upon the uses to which the article is put. The hardness of the rubber or other resilient material in member 20 as well as the shape and proportions of the parts determines this characteristic. The resilient material may be rubber, synthetic rubber, neoprene, various flexible synthetic plastic materials or other masses having the desired characteristics of resilience and strength. The resilient material should not deteriorate in the presence of finishing materials used on the wood handle member and should withstand conditions of its environment including possible contact with detergents and moderate heat.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims:

What is claimed is:

1. A removable handle for a portable article body having a generally flat edge portion comprising a rigid handle member having an outer surface and an elongate cavity formed therein, an elongate slot being formed in a forward portion of said handle member and connecting said outer surface and said cavity, and an elongate mass having its operative portions entirely within said handle member, retained therein by said forward wall, substantially filling said cavity, and defining a restricted slot cooperating with said elongate slot to receive and resiliently retain said generally flat edge portion of said portable article body within said elongate slot and said restricted slot.

2. A portable article comprising a portable article body having a generally flat edge portion and the removable handle of claim 1 wherein the width of said elongate slot corresponds to the thickness of said flat edge portion to restrain said flat edge portion against movement transverse to the plane of said elongate slot.

3. The removable handle of claim 1 wherein said resilient mass comprises a bight portion and two leg portions, said leg portions being disposed on opposite sides of said elongate cavity and being restrained within said elongate cavity by said forward portion, said leg portions defining the restricted slot cooperating with said elongate slot to receive and resiliently retain said generally flat edge portion.

4. The removable handle of claim 3 wherein said handle member is made of ornamental wood, and said resilient mass is made of rubber.

5. The removable handle of claim 3 wherein said bight portion is attached to said handle member within said cavity along a surface opposite said slot.

6. The removable handle of claim 1 wherein said cavity and said elongate slot extend throughout said handle member, said resilient mass extending substantially throughout said cavity.

7. The removable handle of claim 3 wherein said leg portions are of reduced cross section adjacent said bight portion.

8. The removable handle of claim 4 wherein said leg portions are of reduced cross section adjacent said bight portion.

9. The removable handle of claim 8 wherein said resilient member comprises a rubber extrusion having dimensions such that said legs are urged together by the retaining forces within said cavity.

10. The removable handle of claim 7 wherein said legs are spaced from the walls of said cavity between said bight portion and the free ends of said legs.

References Cited

UNITED STATES PATENTS

| | | | |
|---|---|---|---|
| 1,719,461 | 7/1929 | Bolton | 16—114 |
| 2,425,245 | 8/1947 | Johnson | 74—551.9 |
| 2,487,559 | 11/1949 | Kraemer | 16—114 |

FOREIGN PATENTS 312,169  10/1933  Italy.

EVON C. BLUNK, *Primary Examiner.*

H. C. HORNSBY, *Assistant Examiner.*